(12) United States Patent
Agraharam et al.

(10) Patent No.: US 8,069,236 B2
(45) Date of Patent: Nov. 29, 2011

(54) FLOW CONTROL OF EVENTS BASED ON THRESHOLD, GRACE PERIOD, AND EVENT SIGNATURE

(75) Inventors: Sanjay Agraharam, Marlboro, NJ (US); Savitha Iyer, Santa Clara, CA (US); Carlos Guzman, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 312 days.

(21) Appl. No.: 12/333,939

(22) Filed: Dec. 12, 2008

(65) Prior Publication Data

US 2010/0153579 A1 Jun. 17, 2010

(51) Int. Cl.
*G06F 15/173* (2006.01)
(52) U.S. Cl. ..................... 709/223; 709/224
(58) Field of Classification Search .......... 709/223–224, 709/235, 202, 220, 226; 714/26, 47
See application file for complete search history.

(56) References Cited

U.S. PATENT DOCUMENTS

| | | | | |
|---|---|---|---|---|
| 5,944,782 | A  * | 8/1999 | Noble et al. | 709/202 |
| 7,434,109 | B1 * | 10/2008 | Stabile et al. | 714/47 |
| 2006/0277293 | A1 * | 12/2006 | Chagoly et al. | 709/224 |

OTHER PUBLICATIONS eBonding | Enterprise Business Customer Center | AT&T, eBonding, [online]; [retrieved on Nov. 18, 2008]; retrieved from the Internet http://www.corp.att.com/ebcc/bonding/.
AT&T Business Direct, AT&T eBonding, 2007 AT&T Knowledge Ventures, pp. 1-2.

* cited by examiner

*Primary Examiner* — Peling Shaw
(74) *Attorney, Agent, or Firm* — Cantor Colburn LLP

(57) ABSTRACT

A method for controlling sender events arriving at a recipient system is provided. An event transmitted from a sender is received at recipient system, and an event signature is determined. An elapse time between received event and a previous event is calculated. If elapse time is less than or equal to a critical time, it is determined if a counter is equal to or greater than a maximum value. If yes, event is rejected. If not, counter is incremented and the event is processed. If elapse time is greater than critical time, it is determined if elapse time is less than or equal to a grace period and if counter is greater than zero. If yes, counter is decremented and the event is processed. If not, counter is set to zero and event is processed. The critical time, maximum value, and increment/decrement factor are set based on the event signature.

19 Claims, 8 Drawing Sheets

FIG. 3

```
RECEIVE EVENT
// If Event is below the acceptable time threshold (CDT),
// then determine if it should be processed
IF ( Δ(CET, PET) ≤ CDT) THEN
    // If the number of unacceptable events goes beyond
    // the number of unacceptable events (N) then deny it,
    // otherwise record the incident (i.e. increment UEC by the Increment Factor)
    IF (UEC ≥ N) THEN
        DENY processing of the event
    ELSE
        INCREMENT UEC by IF
        PROCESS event
    END
// If the Event is below the Grace Period and we have recorded unacceptable event,
// then count it against the number of unacceptable events records (i.e. decrement UEC
// by the Decrement Factor) and process the event.
ELSE IF ( Δ(CET, PET) ≤ GP AND UEC > 0 ) THEN
    DECREMENT UEC by DF
    PROCESS event
// Otherwise reset the number of unacceptable recorded events
ELSE
    SET UEC to 0
    PROCESS event
END
```

FLOW CONTROL OF EVENTS BASED ON THRESHOLD, GRACE PERIOD, AND EVENT SIGNATURE

BACKGROUND

Exemplary embodiments relate to, but are not limited to, the communications industry, content providers and in general for all applicable measurable information technologies controlling the flow of events.

In today's age, communications technology provides an infrastructure and capabilities to automate the exchange platform of information with clients and vendors. However, clients make take advantage of the infrastructure and overwhelm a recipient system.

Mechanisms are needed to control and process the flow of communications to help prevent a recipient system from being overwhelmed by the automated exchange of information.

BRIEF SUMMARY

Exemplary embodiments include a method for controlling sender events arriving at a recipient system. An event transmitted from a sender is received at a recipient system. An event signature is determined for the event transmitted by the sender. An elapse time is calculated between the received event and a previous event from the sender. If the elapse time is less than or equal to a predetermined critical time, it is determined if a counter is equal to or greater than a maximum value for the counter. If the counter is equal to or greater than the maximum value for the counter, the event is rejected such that the event is not processed. If the counter is less than the maximum value for the counter, the counter is incremented by an increment factor and the event is processed. If the elapse time is greater than the predetermined critical time, it is determined if the elapse time is less than or equal to a grace period and if the counter is greater than zero. If the elapse time is less than or equal to the grace period and if the counter is greater than zero, the counter is decremented by a decrement factor and the event is processed. If the elapse time is greater than the grace period and if the counter is not greater than zero, the counter is set to zero and the event is processed. The predetermined critical time, the maximum value for the counter, the increment factor, and the decrement factor are set based on the event signature for the event.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 3 illustrates an example event flow control in pseudo code in accordance with exemplary embodiments;

The detailed description explains the exemplary embodiments, together with features, by way of example with reference to the drawings.

DETAILED DESCRIPTION OF EXEMPLARY EMBODIMENTS

Exemplary embodiments provide a platform to control the flow transactions in order to avoid system outages due to unacceptable traffic patterns from a client.

Exemplary embodiments provide a mechanism for managing the denial and acceptance of events based on a threshold, a particular elapsed time called a "Grace period", and an event signature. The threshold and/or grace period can be applied based on the signature of the event. The "signature of an event" may be defined as data within the event that can be used to categorize the event in accordance with exemplary embodiments.

The term "unacceptable traffic pattern" used in exemplary embodiments refers to the rules used to determine if an event should be processed. In particular, exemplary embodiments may focus on a behavioral pattern of groups of transactions with a high rate separated and/or followed by short intervals of transactions close to the high rate threshold.

Figure 1:
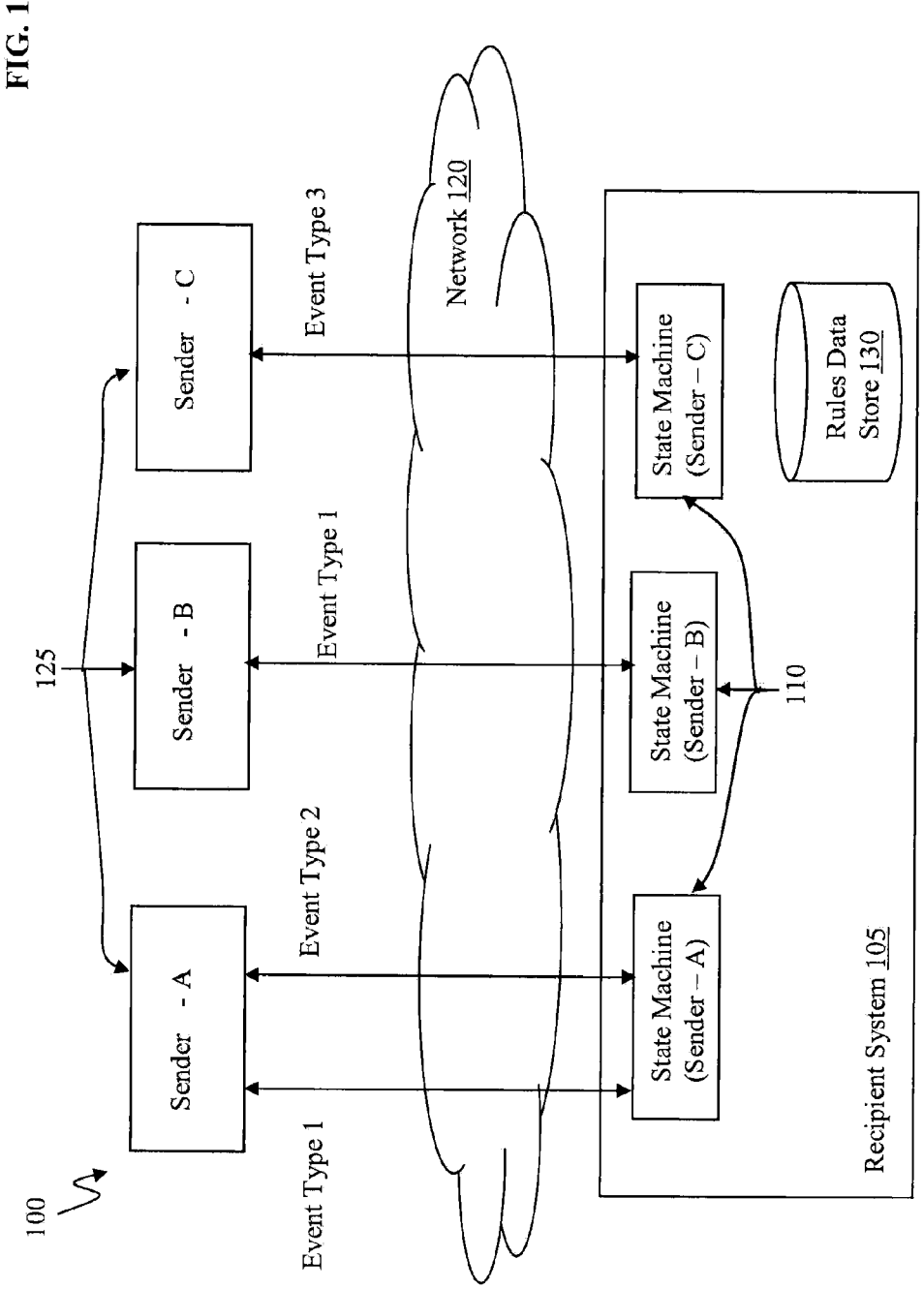
FIG. 1 illustrates a block diagram in accordance with exemplary embodiments.

FIG. 1 illustrates a block diagram 100 in accordance with exemplary embodiments.

In the block diagram 100, a recipient system 105 is configured to receive, control, and process requests (as events) received from sender systems 125 via a network. The recipient system 105 includes one or more modules, applications, etc., represented as state machines 110 for implementing flow control rules to process events from senders 125 via the network 120. The recipient system 105 and the sender systems 125 may be representative of computer processing devices including one or more processors configured to execute computer readable instructions stored in memory and configured to implements operations, functions, methods, and logic discussed herein.

Further regarding the network 120, the network 120 may include circuit-switched and/or packet-switched technologies and devices, such as routers, switches, hubs, gateways, etc., for facilitating communications. The network 120 may include wireline and/or wireless components utilizing, e.g., IEEE 802.11 standards for providing over-the-air transmissions of communications. The network 120 can include IP-based networks for communication between a customer service center and clients/users. The network 120 can manage multiple accounts as established by particular users. These accounts may then be used to provide access to services as described herein.

Also, the network 120 may include wireline and/or wireless components utilizing standards for, e.g., multimedia messaging services (MMS). The network 120 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, supporting a wide range of standard interfaces.

According to exemplary embodiments, the network 120 facilitates transmission of media (e.g., images, video, data, multimedia messaging, etc.) from content services provider systems to customers/users via devices. In exemplary embodiments, the network 120 can include a managed IP and/or wireless network administered by a service provider, which can control bandwidth and quality of service for the communications discussed herein. The network 120 may be implemented in a wireless fashion, e.g., using wireless protocols and technologies, such as WiFi, WiMax, BLUETOOTH, etc. The network 120 can also be a packet-switched network, such as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

In the recipient system 105, the state machines 110 are configured to process events received from the senders 125 according to rules stored, e.g., in a data store 130 according to exemplary embodiments. The state machines 110 may be configured with variables to determine the flow control rules, which can vary by client (such as sender A 125, sender B 125, and sender C 125) and/or event type (e.g., event type 1, event type 2, and event type 3, which may correspond to respective event signatures). This data for the flow control rules is made available on the data store 130 either internal (e.g., in memory) or external (e.g., remotely in a file or database system) to the recipient system 105. The recipient system 105 can access the data store 130 to retrieve the flow control data rules, e.g., at system start-up time when the recipient system 105 is initially started, or on demand after the start-up time.

For all relationships, the variables can be subdivided based of the event signature. As discussed herein, a sender can have more than one set of rules applied to its traffic based on the type of events it generates, such as event type 1, event type 2, event type 3, etc., in FIG. 1. For example, sender B of the sending system 125 can generate billing and provisioning related transactions (events) and the recipient system 105 can apply different sets of rules for each type, based on this event signature. The premise behind this methodology is that a sending system can exhibit different types of traffic patterns based on its transactions (i.e., events), which defines the event signature for the traffic pattern. If it is determined that the event signature is in a particular category, corresponding rules apply to the events having that event signature.

Figure 2:
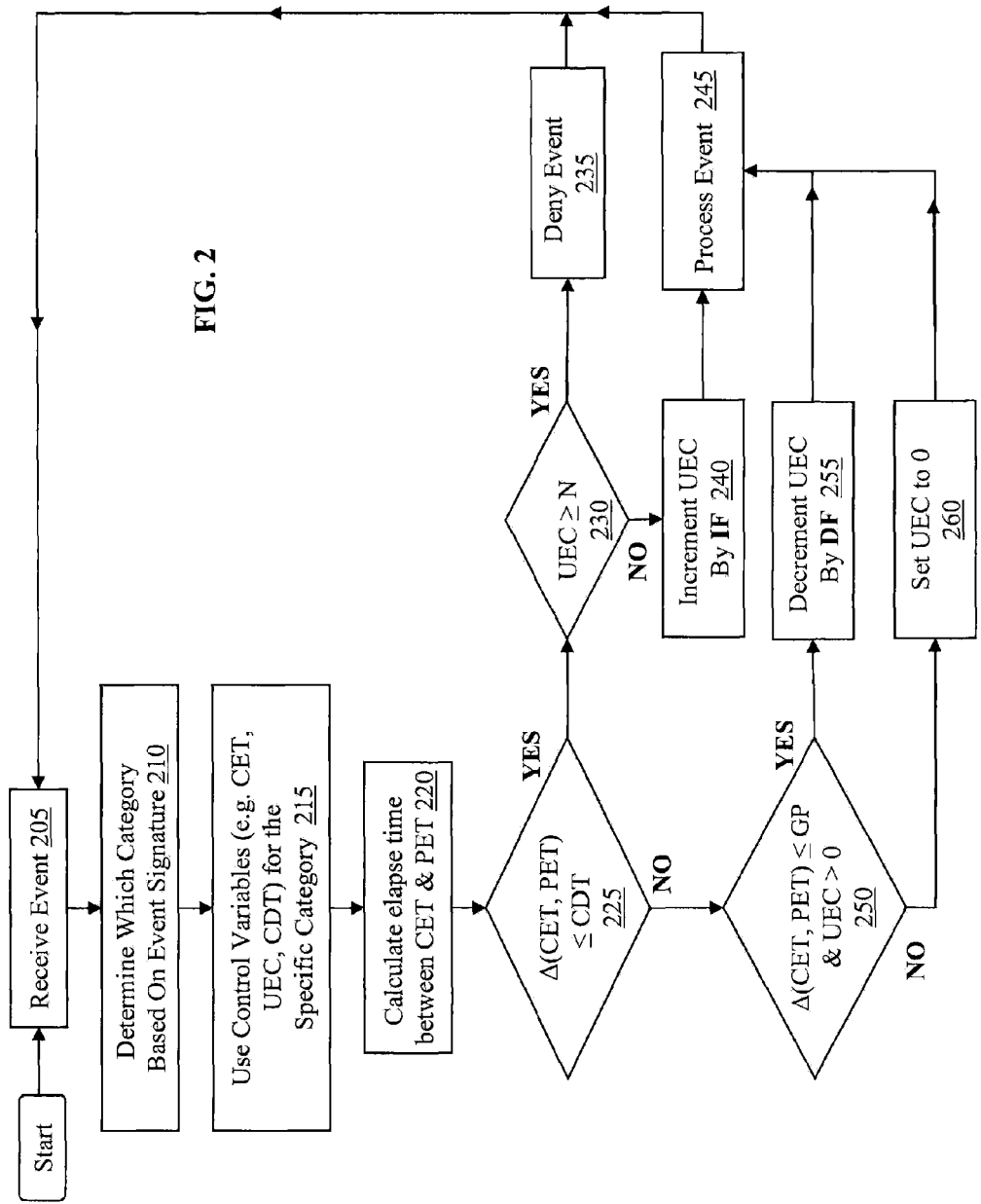
FIG. 2 illustrates an event control processing flow chart in accordance with exemplary embodiments.

FIG. 2 illustrates an event control processing flow chart in accordance with exemplary embodiments.

The recipient system 105 receives an event from the sender 125 via the network 120 at 205. The recipient system 105 controls and processes the event based on rules stored in the date store 130.

The recipient system 105 determines which category the event belongs to based on the event signature at 210. For example, the recipient system 105 can determine the event signature for the event based on data contained in the event and can determine in which specific category the event belongs.

Based on the specific category in which the event signature of the event is classified, the recipient system 105 uses control variables (e.g., critical delta time (CDT) unacceptable event counter (UEC) maximum, etc.) for the specific category at 215.

The elapse time between the received event (current event time, CET) and the previous event (previous event time, PET) is calculated by the recipient system 105 (e.g., utilizing the state machine 110) at 220. For example, an elapse time is calculated between the received event and an immediately preceding event from the sender.

The state machine 110 of the recipient system 105 determines whether the elapse time is less than or equal to the critical delta time (CDT) at 225. For example, a predetermined critical time (CDT) is set and is defined as a reasonable time between the received event (time) and an immediately preceding event (time) from the sender. For example, the CDT may be set to 5 seconds.

If the elapse time between the received event (CET) and previous event (PET) is less or equal to the CDT, the recipient system 105 determines if an unacceptable event counter (UEC) is greater than or equal to a maximum number of unacceptable events (N) which is set in advance at 230. For example, the UEC is a counter that indicates the number of times the elapse time is less than the predetermined critical time, and the UEC is incremented/decremented by a predetermined value. A maximum value (N) for the UEC is a predetermined value that represents the number of events for which the elapsed time is less than the predetermined critical time. For example, the maximum number of unacceptable events for the UEC may be set to N=5.

If the UEC is greater than or equal to a maximum value (N), the recipient system 105 denies the event at 235.

If the UEC is not greater than or equal to the maximum value (N), the recipient system 105 increments the unacceptable event counter (UEC) by an increment factor (IF) at 240, and the recipient system 105 processes the event at 245. The IF may be a number to increment the UEC, and the IF may, e.g., be 1. The UEC stores the number of unacceptable events that are received from the sender, which fail to meet the CDT according to exemplary embodiments.

If the elapse time between the received event (CET) and previous event is not less than or equal to the critical delta time (CDT), the recipient system 105 determines if the elapse time is less than or equal to the "Grace Period" and if there were recent unacceptable events at 250. The grace period (GP) may, e.g., be set at 10 seconds.

If the elapse time is less than or equal to the "Grace Period" and if there were recent unacceptable events, the recipient system 105 decrements the unacceptable event counter by a decrement factor (DF) at 255, and the system 105 processes the event at 245. The DF may be a number to decrease the UEC, and the DF may, e.g., be 1.

If the elapse time is greater than the "Grace period" and there were no previous unacceptable events recorded, the recipient system 105 sets the unacceptable event counter to zero at 260, and the recipient system 105 processes the event at 245.

After the event is processed, the state machine 110 of the recipient system 105 may receive another event for processing at 205 and the event control flow continues. The data store 130 can store the data related to processing events from various senders 125.

Note that blocks 250 and 255 are used to avoid resetting the counter of unacceptable events immediately after an acceptable event is received and their purpose is to avoid accepting a full cycle (N) of unacceptable events in such a case. The evaluation in blocks 250 and 255 may only occur for events that have a particular elapsed time. This elapsed time, as mentioned earlier, is referred to as the "Grace period". The grace period allows events to continue to be monitored even though the elapse time of the received event is greater than the CDT. As such, the grace period allows for a delay in the network that may have caused the elapse time of the event to be greater than the CDT, and the recipient system 105 does not automatically reset the UEC just because one event (out of a series of events) from the sender has an elapse time greater than the CDT. For example, the CDT may be set to 5 seconds, the grace period GP) may be set at 10 seconds, and 4 previous events from the sender A 125 have been received within the CDT (that is their elapse time has been equal to or less than 5 seconds). The current event may have an elapsed time greater than 5 seconds (CDT) but less than 10 seconds (GP). Although 1 event has now been received from the sender A 125 with an elapse time greater than the CDT, the recipient system 105 is configured to maintain the current count of the ULEC without automatically resetting the UEC to 0. Thus, if other events are received having an elapse time equal to or less than the CDT (5 seconds), the recipient system 105 can increment the UEC and can prevent the other events from being processed if the maximum value N for the UEC is reached.

The grace period is typically set to a large value (typically hours) and should at least be greater than the time period that will cause the counter to come to 0 by decrementing the counter when the elapsed time is greater than CDT. In the above example the grace period of 25 seconds is more appropriate.

In accordance with exemplary embodiments, the predetermined values, such as the critical delta time (CDT), maximum value for the counter (N), increment (IF) and decrement (DF) values for the counter, and the grace period (GP), are set based on the event signature of the event. In exemplary embodiments, the event signature of the event is used to determine how the event is processed by the recipient system 105. For example, the recipient system 105 may detect that an event (and/or the previous or subsequent events) from a sender 125 has an event signature corresponding to a specific category for ordering. As such, the recipient system 105 retrieves predetermined values (CDT, N, IF, DF, GP) for processing the events in the specific ordering category, and the recipient system 105 will continue to process events from the sender 125 having that event signature using the predetermined values for the specific ordering category. If the recipient system 105 detects that the event signature changes, the recipient system 105 will utilize the corresponding predetermined values (CDT, N, IF, DF, GP) which apply to the new event signature.

In another example, the recipient system 105 may detect that an event (and/or the previous or subsequent events) is being received that has an event signature that corresponds to billing. The recipient system 105 retrieves predetermined values (CDT, N, IF, DF, GP) for processing events in the specific billing category. It may be recognized by the network administrator of the recipient system 105 that, e.g., the specific billing category has a higher value than ordering. As such, the CDT, N, and GP (or other predetermined values) may be set to higher values (or lower values) which allow events having the billing event signature to be received at higher rates (than the events having the ordering event signature). It is appreciated that the predetermined values can be set as desired in accordance with exemplary embodiments and are not limited by any examples discussed herein.

Further, in accordance with exemplary embodiments, the state machines 110 of the recipient system 105 may be configured as self-learning modules. The state machines 110 can be configured to automatically adjust variables such as the (CDT, N, IF, DF, GP) based on the behavior of the sender 125 (client). For example, the state machines 110 can determine that a pattern is established for the sender 125. The state machines 110 may recognize that, e.g., the maximum number of unacceptable events N should be increased/decreased or the CDT should be increased/decreased for the sender 125.

The relationships between the recipient and senders are not meant to be limited. There could be several types of relationships between the recipient system 105 implementing the flow control algorithm and the system(s) sending the events (referred to as the sender 125). For example, there may be a one-to-one relationship, one-to-many relationship, and many-to-many relationship. For one-to-many or many-to-many relationships between agent(s) (or state machines 110) and the senders (senders 125), the flow control system can apply the same set of variables (e.g., UEC, N, CDT) or have a unique set for each sender (e.g., for sender A, sender B, or sender C).

Also, in accordance with exemplary embodiment, the grace period provides a buffer to allow the recipient system to continue tracking and counting events from the sender, even if an intervening event arrives with an elapse time greater that the predetermined critical time but less than the grace period.

FIG. 3 illustrates an example event flow control in pseudo code 300 in accordance with exemplary embodiments. It is understood that the pseudo code 300 is illustrated for explanatory purposes and is not meant to be limiting.

In the pseudo code 300 example, the following are provided: CET (Current Event time) is the arrival time of the last received event. PET (Previous Event Time) is the arrival time of the previous event. CDT (Critical Delta time) is the unacceptable elapse (delta) time between two events, which requires evaluation of acceptance. $\Delta(x_n, x_{n-1})$ is a function that calculates the elapse (delta) time between two events. UEC (Unacceptable Event Counter) is a data store holding the value of the number of unacceptable events received by the system. N is the maximum number of unacceptable events that can be processed during the CDT. GP (Grace Period) is an acceptable delta time between two events, where the GP>CDT. The GP is used in conjunction with the UEC to manage the amount of unacceptable events.

FIGS. 4, 5, 6, and 7 illustrates graphs depicting examples of event processing in accordance with exemplary embodiments.

Figure 4:
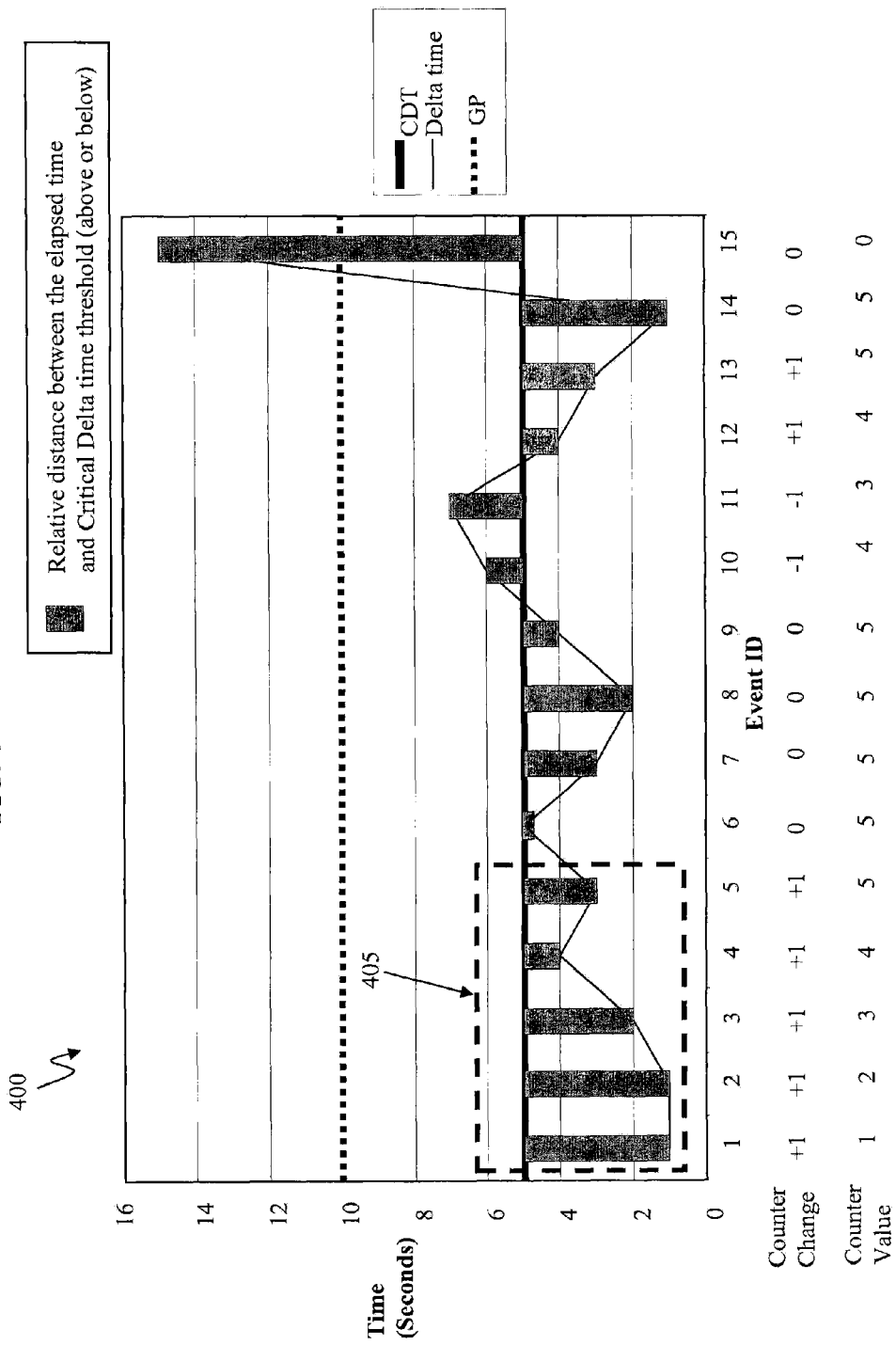
FIGS. 4, 5, 6, and 7 illustrate graphs depicting examples of event processing in accordance with exemplary embodiments.

FIG. 4 illustrates a graph 400 in accordance with exemplary embodiments. In the graph 400, the X-axis is the event identifier and shows events 1 through 15. The Y-axis is the elapsed time between previous events. N (which is the UEC) is set to 5, the CDT is set to 5 seconds, and the grace period is set to 10 seconds. The graph 400 shows acceptable events as block 405. The block 405 includes a series of processed events (which are events 1, 2, 3, 4, and 5) within the critical delta time prior to having the UEC reach a value of N. Since the acceptable events 1, 2, 3, 4, and 5 are less than or equal to the CDT (5 seconds), the UEC is incremented by 1 for each event in the block 405. Here the grace period could also be established to at least 25 seconds for more practical purposes.

Figure 5:
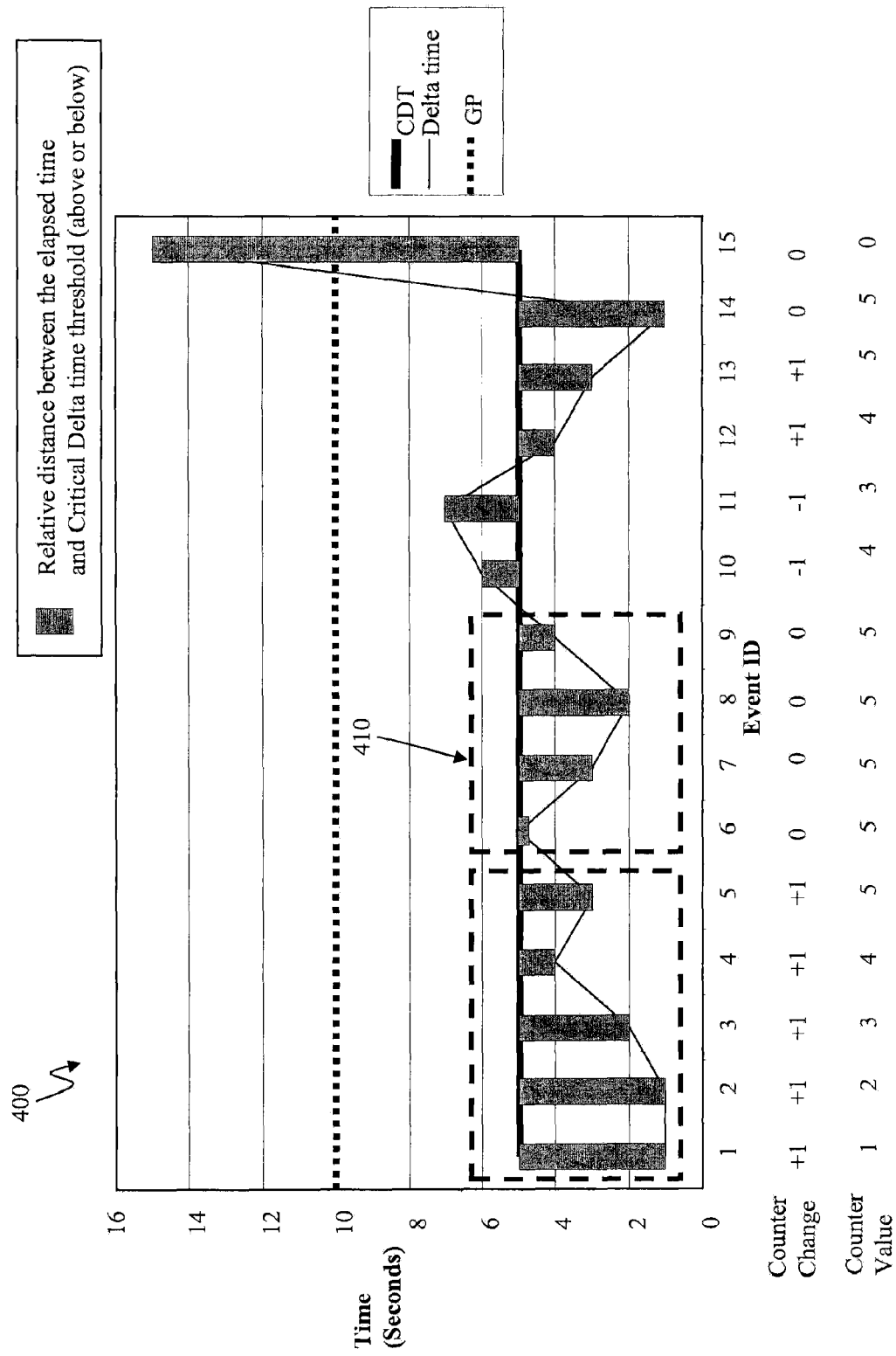

FIG. 5 shows the graph 400 and shows an example illustration of rejected events in accordance with exemplary embodiments. In the graph 400, a block 410 illustrates a series of rejected events (which are events 6, 7, 8, and 9) within the critical delta time and the UEC≧N. As can be seen, the UEC is not incremented for each rejected event 6, 7, 8, and 9 in the block 410.

Figure 6:
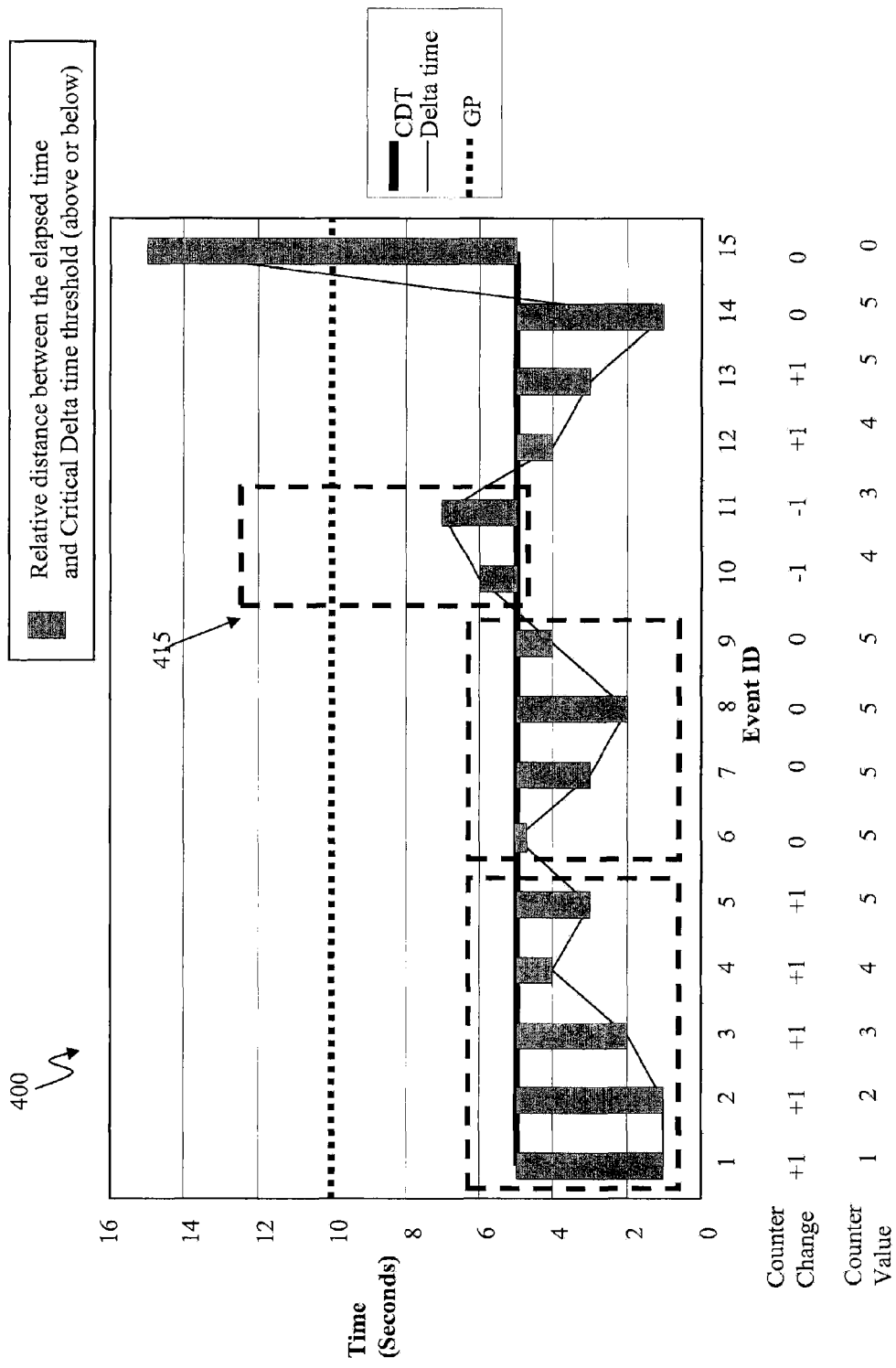

FIG. 6 shows the graph 400 and shows an example illustration of accepted events within a "Grace Period" in accordance with exemplary embodiments. In the graph 400, the block 415 illustrates a series of accepted events (which are events 10 and 11) within the grace period time period. The grace period (GP) is set at 10 seconds. The elapse time for events 10 is greater than the CDT (which is 5 seconds) but less than the GP (which is 10 seconds). The UEC is decremented by 1 for event 10. Similarly, the elapse time for event 11 is greater than the CDT (5 seconds) but less than the GP (10 seconds) and the ULEC is decremented by 1 for event 11.

Figure 7:
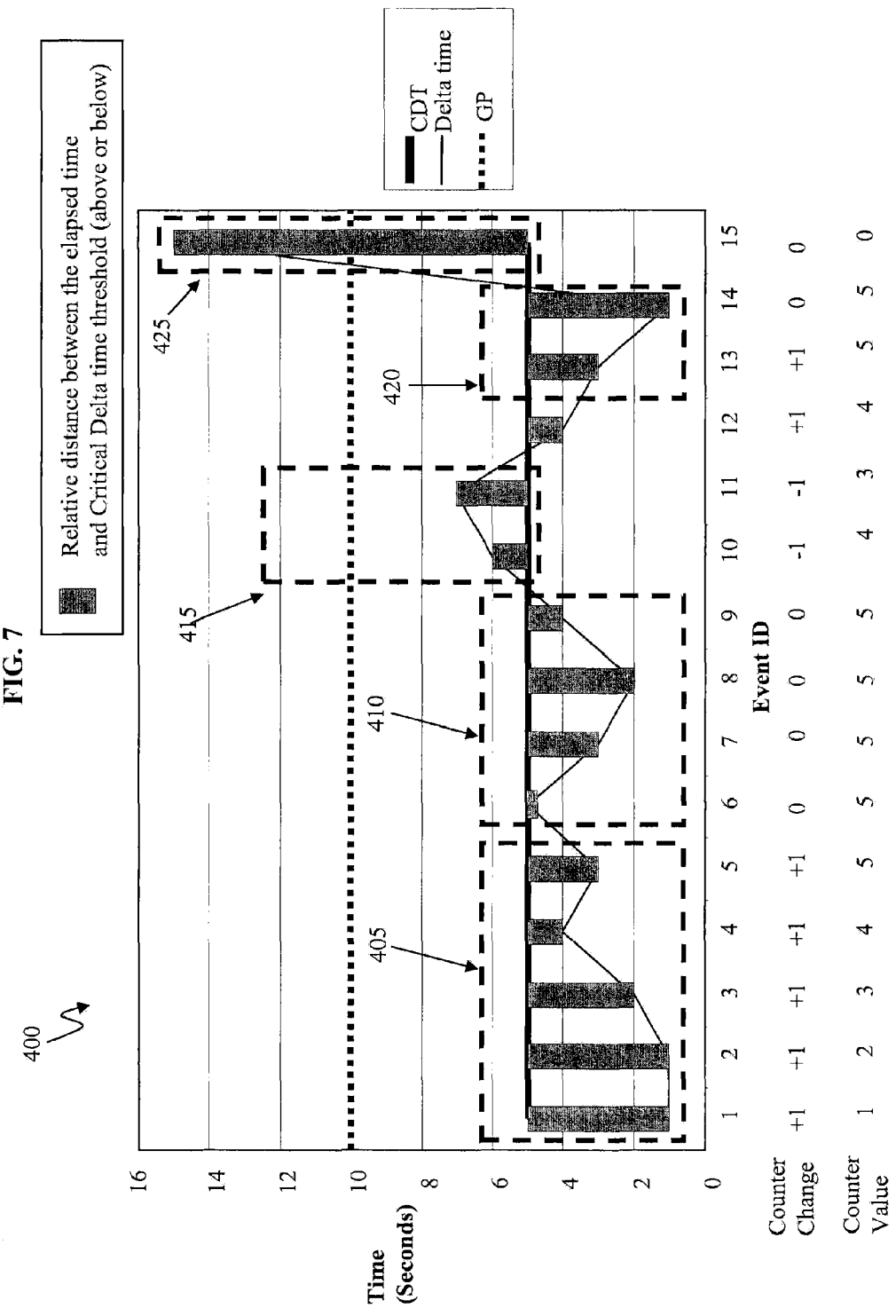

FIG. 7 shows the graph 400 and shows an example illustration of rejected and accepted events after a grace period in accordance with exemplary embodiments. In the graph 400, a block 420 shows a series of rejected events (which are events 13 and 14) after the grace period. Event 12 is still processed as the UEC is <N. A block 425 shows an accepted event (which is event 15) after the grace period. The elapse time for the accepted event of block 425 is greater than the GP (10 seconds). Note that the UEC is set to zero when the event 15 at block 425 is received. It is understood that the graph 400 in the FIGS. 4, 5, 6, and 7 provides an example scenario for illustrative purposes and is not meant to be limiting.

Figure 8:
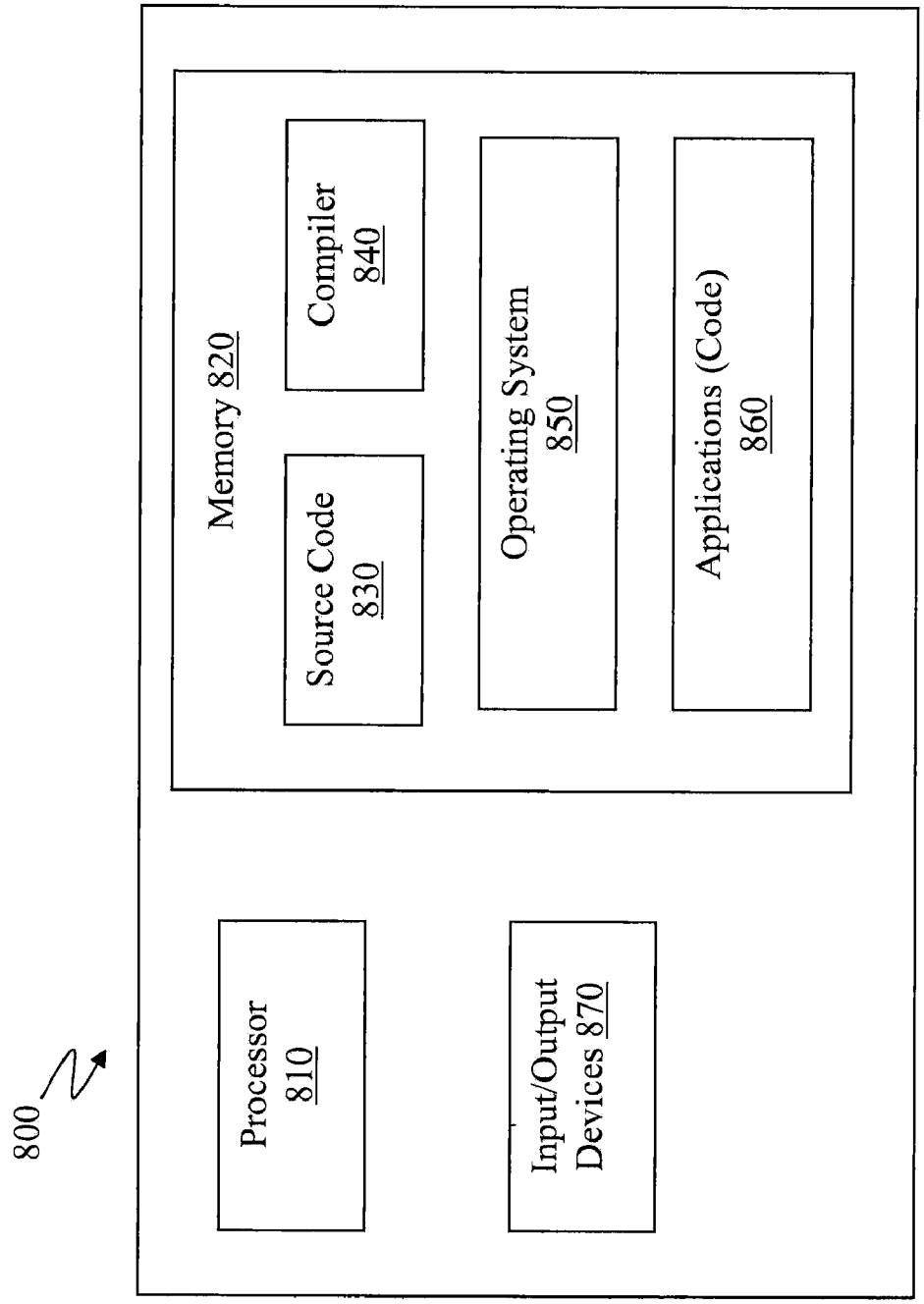
FIG. 8 illustrates an example of a computer having elements that may be used in implementing exemplary embodiments.

FIG. 8 illustrates an example of a computer 800 having elements that may be used in implementing exemplary embodiments. The computer 800 includes, but is not limited to, PCs, workstations, systems, laptops, PDAs, palm devices, servers, mobile devices, communication devices, cell phones, and the like. The computer 800 may include a processor 810, memory 820, and one or more input and/or output (I/O) 870 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a data signal processor (DSP), or an auxiliary processor among several processors associated with the computer 800, and the processor 810 may be a semiconductor based microprocessor (in the form of a microchip) or a macroprocessor.

The memory 820 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. In the example illustrated in FIG. 8, the software in the memory 820 includes a suitable operating system (O/S) 850, compiler 840, source code 830, and one or more an application 860 (or modules) of the exemplary embodiments.

The operating system 850 controls the execution of other computer programs, and provides scheduling, input-output control, file and data management, memory management, and communication control and related services. It is contemplated by the inventors that the application 860 for implementing exemplary embodiments is applicable on all other commercially available operating systems.

The application 860 may be a source program, executable program (object code), script, or any other entity comprising a set of instructions to be performed. When a source program is to be executed, then the program is usually translated via a compiler (such as the compiler 840), assembler, interpreter, or the like, which may or may not be included within the memory 820, so as to operate properly in connection with the O/S 850. Furthermore, the application 860 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 870 may include input devices such as, for example but not limited to, a mouse, keyboard, scanner, microphone, biometric input device(s), etc. Furthermore, the I/O devices 870 may also include output devices, for example but not limited to, a printer, display, etc. Also, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 include may include modems, gateways, receivers, transmitters, transceivers, etc. for communicating over a communications network.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software, it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable medium can be stored, communicated, propagated, or transported for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 860 is implemented in hardware, the application 860 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for controlling sender events arriving at a recipient system, comprising:
   receiving an event at the recipient system transmitted from a sender, wherein the event is a request;
   determining an event signature for the event transmitted by the sender, wherein the event signature can be determined as a billing category in one case, and wherein the event signature can be determined as an ordering category in another case;
   calculating an elapsed time between the event received and a previous event from the sender;
   when the elapsed time is less than or equal to a predetermined critical time, further comprising:
      determining when a counter is equal to or greater than a maximum value for the counter;
      when the counter is equal to or greater than the maximum value for the counter, rejecting the event such that the event is not processed;
      when the counter is less than the maximum value for the counter, incrementing the counter by an increment factor and processing the event;
   when the elapsed time is greater than the predetermined critical time, determining when the elapsed time is less than or equal to a grace period and when the counter is greater than zero;
   when the elapsed time is less than or equal to the grace period and when the counter is greater than zero, decrementing the counter by a decrement factor and processing the event; and
   when the elapsed time is greater than the grace period and when the counter is not greater than zero, setting the counter to zero and processing the event;
   wherein the predetermined critical time, the grace period, the maximum value for the counter, the increment factor, and the decrement factor are set based on the event signature for the event; and
   wherein based on a detected pattern of the sender, the recipient system automatically adjusts the increment factor and the decrement factor.

2. The method of claim 1, further comprising determining whether the event signature for the sender has changed to a new event signature.

3. The method of claim 2, wherein in response to the event signature changing to the new event signature, a new predetermined critical time, a new maximum value for the counter, a new increment factor, a new grace period, and a new decrement factor are set based on the new event signature.

4. The method of claim 1, wherein the increment factor is a predetermined number by which to increment the counter.

5. The method of claim 1, wherein the decrement factor is a predetermined number by which to decrement the counter.

6. The method of claim 1, wherein the event signature is based on data contained in the event.

7. The method of claim 1,
   wherein the billing category has a higher value than the ordering category such that a plurality of events for the billing category are received ata higher rate than a pluralityof events for the ordering category.

8. A recipient system configured to control sender events arriving at the recipient system, comprising:
   memory for storing one or more programs for controlling sender events arriving at the recipient system; and
   a processor, functionally coupled to the memory, the processor being responsive to computer-executable instructions contained in the program and operative to:
   receiving an event transmitted from a sender;
   determining an event signature for the event transmitted by the sender, wherein the event signature can be determined as a billing category in one case, and wherein the event signature can be determined as an ordering category in another case;
   calculating an elapsed time between the event and a previous event from the sender;
   determining when the elapsed time is less than or equal to a predetermined critical time, wherein a counter is increased by an increment factor when the elapsed time is less than or equal to the predetermined critical time;

when the elapsed time is greater than the predetermined critical time, determining when the elapsed time is less than or equal to a grace period and when the counter is greater than zero;

when the elapsed time is less than or equal to the grace period and when the counter is greater than zero, decrementing the counter by a decrement factor and processing the event; and when the elapsed time is greater than the grace period and when the counter is not greater than zero, setting the counter to zero and processing the event;

wherein the predetermined critical time, the grace period, the maximum value for the Counter, the increment factor, and the decrement factor are set based on the event signature for the event; and wherein based on a detected pattern of the sender, the recipient system automatically adjusts the increment factor and the decrement factor.

9. The recipient system of claim 8, further comprising determining whether the event signature for the sender has changed to a new event signature;

wherein in response to the event signature changing to the new event signature, a new predetermined critical time, a new maximum value for the counter, a new grace period, a new increment factor, and a new decrement factor are set based on the new event signature.

10. The recipient system of claim 8, wherein the grace period is a buffer to allow the recipient system to continue tracking and counting events from the sender, even when an intervening event arrives with an elapsed time greater that the predetermined critical time but less than the grace period.

11. The recipient system of claim 8, wherein the decrement factor is a predetermined number by which to decrement the counter; and wherein the increment factor is a predetermined number by which to increment the counter.

12. The recipient system of claim 8, wherein the event signature is based on data contained in the event.

13. The recipient system of claim 8, wherein the billing category has a higher value than the ordering category such that a plurality of events for the billing category are received at a higher rate thatn a plurality of events for the ordering category.

14. A computer program product, tangibly embodied on a computer readable medium, the computer program product including instructions for causing a recipient system to execute a method for controlling sender events arriving at the recipient system, comprising:

receiving an event transmitted from a sender;

determining an event signature for the event transmitted by the sender, wherein the event signature can be determined as a billing category in one case, and wherein the event signature can be determined as an ordering category in another case;

calculating an elapsed time between the event received and a previous event from the sender;

when the elapsed time is less than or equal to a predetermined critical time, further comprising:

determining when a counter is equal to or greater than a maximum value for the counter;

when the counter is equal to or greater than the maximum value for the counter, rejecting the event such that the event is not processed;

when the counter is less than the maximum value for the counter, incrementing the counter by an increment factor and processing the event;

when the elapsed time is greater than the predetermined critical time, determining when the elapsed time is less than or equal to a grace period and when the counter is greater than zero;

when the elapsed time is less than or equal to the grace period and when the counter is greater than zero, decrementing the counter by a decrement factor and processing the event; and when the elapsed time is greater than the grace period and when the counter is not greater than zero, setting the counter to zero and processing the event;

wherein the predetermined critical time, the maximum value for the counter, the grace period, the increment factor, and the decrement factor are set based on the event signature for the event; and wherein based on a detected pattern of the sender, the recipient system automatically adjusts the increment factor and the decrement factor.

15. The computer program product of claim 14, further comprising determining whether the event signature for the sender has changed to a new event signature.

16. The computer program product of claim 15, wherein in response to the event signature changing to the new event signature, a new predetermined critical time, a new maximum value for the counter, a new grace period, a new increment factor, and a new decrement factor are set based on the new event signature.

17. The computer program product of claim 14, wherein the increment factor is a predetermined number by which to increment the counter.

18. The computer program product of claim 14, wherein the decrement factor is a predetermined number by which to decrement the counter.

19. The computer program product of claim 14, wherein the event signature is based on data contained in the event.

* * * * *